(12) United States Patent
Fonda et al.

(10) Patent No.: US 9,146,141 B2
(45) Date of Patent: Sep. 29, 2015

(54) PNEUMATIC ENERGY HARVESTING AND MONITORING

(75) Inventors: James W. Fonda, Moscow Mills, MO (US); Raymond J. Slesinski, Arnold, MO (US)

(73) Assignee: THE BOEING COMPANY, Chicago, IL (US)

( * ) Notice: Subject to any disclaimer, the term of this patent is extended or adjusted under 35 U.S.C. 154(b) by 1755 days.

(21) Appl. No.: 12/565,116

(22) Filed: Sep. 23, 2009

(65) Prior Publication Data

US 2011/0071774 A1    Mar. 24, 2011

(51) Int. Cl.
*G01D 21/00* (2006.01)
*H02S 10/20* (2014.01)
*F15B 19/00* (2006.01)

(52) U.S. Cl.
CPC .............. *G01D 21/00* (2013.01); *F15B 19/005* (2013.01); *H02S 10/20* (2014.12)

(58) Field of Classification Search
CPC ........ G01D 21/00; F15B 19/005; H02S 10/20
USPC ................... 702/50, 60, 61, 62, 63; 290/43
See application file for complete search history.

(56) References Cited

U.S. PATENT DOCUMENTS

| | | | |
|---|---|---|---|
| 5,419,135 A * | 5/1995 | Wiggs | 60/641.15 |
| 5,843,212 A * | 12/1998 | Nanaji | 96/4 |
| 5,899,411 A * | 5/1999 | Latos et al. | 244/53 A |
| 6,051,958 A * | 4/2000 | Hwang | 320/161 |
| 6,201,314 B1 | 3/2001 | Landry | |
| 6,281,594 B1 | 8/2001 | Sarich | |
| 6,957,536 B2 * | 10/2005 | Litwin et al. | 60/641.8 |
| 6,981,377 B2 * | 1/2006 | Vaynberg et al. | 60/641.8 |
| 8,525,361 B1 * | 9/2013 | Kramer et al. | 290/43 |
| 2004/0232890 A1 * | 11/2004 | Ariga et al. | 320/150 |
| 2006/0061107 A1 | 3/2006 | Cadaret | |
| 2007/0114422 A1 | 5/2007 | Berkcan et al. | |
| 2008/0066796 A1 | 3/2008 | Mitchell et al. | |
| 2008/0127512 A1 | 6/2008 | Barclay | |
| 2009/0288695 A1 * | 11/2009 | Jaisinghani | 136/244 |
| 2010/0045241 A1 * | 2/2010 | Nousiainen | 320/137 |

FOREIGN PATENT DOCUMENTS

FR      2824907 A1    11/2002

* cited by examiner

Primary Examiner — Alexander Satanovsky
(74) Attorney, Agent, or Firm — Yee & Associates, P.C.

(57) ABSTRACT

A method and apparatus for monitoring a pneumatic system. A number of parameters are monitored using a monitoring device connected to the pneumatic system, an energy harvesting unit configured to generate electrical energy from a gas in the pneumatic system, and a controller. The monitoring device comprises a number of sensors configured to detect the number of parameters. The controller is in communication with the number of sensors and the energy harvesting unit and is configured to process measurements for the number of parameters detected by the number of sensors and control operation of the energy harvesting unit. The number of sensors and the controller are powered by the energy harvesting unit. The monitoring device is powered using the electrical energy generated by the energy harvesting unit.

24 Claims, 7 Drawing Sheets

PNEUMATIC ENERGY HARVESTING AND MONITORING

BACKGROUND INFORMATION

1. Field

The present disclosure relates generally to energy harvesting units and, in particular, to energy harvesting units that generate electrical energy from movement of fluids. Still more particularly, the present disclosure relates to a method and apparatus for generating electrical energy from a pneumatic system and monitoring a pneumatic system.

2. Background

Pneumatic systems use pressurized gas to generate mechanical energy. For example, pneumatic systems are often used in manufacturing and maintenance environments to operate equipment. For example, drills, sanders, fastener installation tools, rivet guns, and/or other equipment may be operated using a compressed gas. In an environment in which a pneumatic system is used, gas lines connect a gas compressor system to equipment. The pneumatic system may use compressed gasses such as air, helium, neon, nitrogen, and other suitable gasses.

Pneumatic systems are used, because these systems have long operating lives compared to other types of systems and low maintenance requirements.

Although pneumatic systems have low maintenance requirements, monitoring of these systems is still desirable to identify degradation in performance that may require maintenance. For example, different equipment connected to the pneumatic system may require different amounts of pressures for operation. If the pressure in one or more gas lines is less than the pressure needed for the equipment attached to those gas lines, maintenance may be required. This maintenance may involve identifying gas lines in which potential defects may be present. Maintenance also may involve adjusting the amount of pressure provided by different gas lines.

Monitoring of these systems is performed using monitoring devices. These monitoring devices often run on electricity. Electrical lines are installed to the locations in which the monitoring devices are present to provide power to operate the monitoring devices. These monitoring devices may monitor various components of the pneumatic system. For example, gas lines may be monitored for parameters such as, for example, gas, flow, pressure, moisture, and/or other suitable parameters. These monitoring devices have displays that may be read by a human operator to determine whether the parameters are within desired levels or ranges.

Installation of monitoring devices may be difficult, depending on the location. Some locations may be difficult to reach. Locations that are difficult to reach also may be more difficult to access for maintenance or reading parameters, in addition to being more difficult to install. Further, depending on the number of monitoring devices installed, the number of wires needed to provide power to the monitoring devices may be bulky or difficult to connect to the power source.

One solution involves employing monitoring devices that use batteries. However, maintenance costs for these types of monitoring systems increase when batteries are present. The batteries require maintenance when they become depleted.

Accordingly, it would be advantageous to have a method and apparatus which takes into account one or more of the issues discussed above, as well as possibly other issues.

SUMMARY

In one advantageous embodiment, an apparatus comprises a number of sensors configured to detect a number of parameters, an energy harvesting unit, and a controller connected to the number of sensors and the energy harvesting unit. The energy harvesting unit is configured to generate electrical energy from a compressed gas in a pneumatic system. The controller is configured to process measurements for the number of parameters detected by the number of sensors. The number of sensors and the controller are powered by the energy harvesting unit.

In another advantageous embodiment, an apparatus comprises a number of sensors configured to detect a number of parameters in a fluid system, an energy harvesting unit, and a controller. The energy harvesting unit is configured to generate electrical energy from a fluid in the fluid system. The controller is in communication with the number of sensors and the energy harvesting unit. The controller is configured to process measurements for the number of parameters detected by the number of sensors and control operation of the energy harvesting unit. The number of sensors and the controller are powered by the electrical energy generated by the energy harvesting unit.

In yet another advantageous embodiment, a method is present for monitoring a pneumatic system. A number of parameters are monitored using a monitoring device connected to the pneumatic system, an energy harvesting unit configured to generate electrical energy from a gas in the pneumatic system, and a controller. The monitoring device comprises a number of sensors configured to detect the number of parameters. The controller is in communication with the number of sensors and the energy harvesting unit and is configured to process measurements for the number of parameters detected by the number of sensors and control operation of the energy harvesting unit. The number of sensors and the controller are powered by the energy harvesting unit. The monitoring device is powered using the electrical energy generated by the energy harvesting unit.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
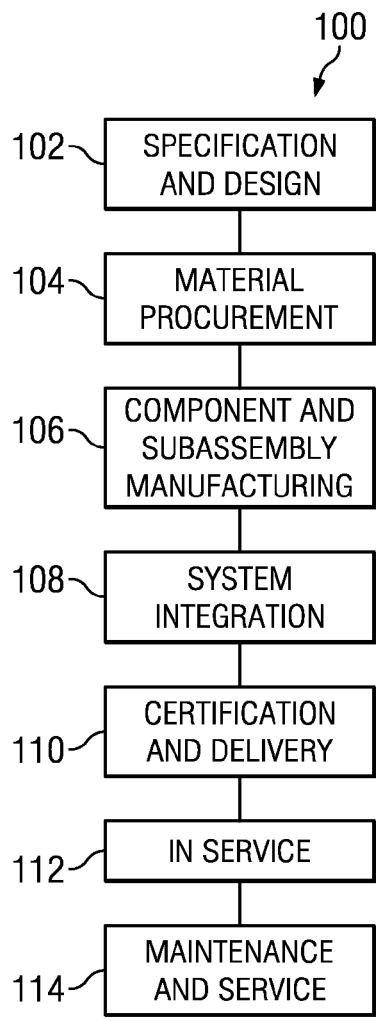
FIG. 1 is an illustration of an aircraft manufacturing and service method in which an advantageous embodiment may be implemented.
Figure 2:
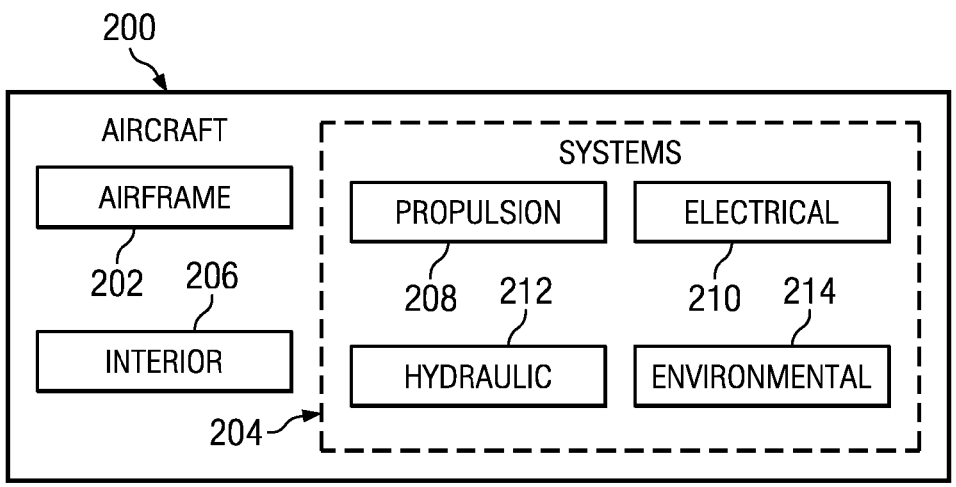
FIG. 2 is an illustration of an aircraft in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included.

Although an aerospace example is shown, different advantageous embodiments may be applied to other industries, such as the automotive or ship building industry. As additional examples, the different advantageous embodiments may be implemented in still other manufacturing, service, and construction environments. For example, the different advantageous embodiments may be implemented in a building ship facility, an automobile manufacturing plant, a ship, a spacecraft, an aircraft, a maintenance facility, and/or other suitable environments.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

A number of the different advantageous embodiments may be implemented in one or more steps in aircraft manufacturing and service method 100. For example, the different advantageous embodiments may be used to monitor fluid systems used to power equipment employed during, for example, component and subassembly 106, system integration 108, and maintenance and service 114.

The different advantageous embodiments recognize and take into account a number of different considerations. For example, the different advantageous embodiments recognize and take into account that currently used monitoring devices require increased work by human operators. Currently, a human operator moves to each of the monitoring devices to obtain measurements about parameters for the pneumatic system in different locations. Some of these locations may be difficult to reach to read displays when making measurements. As one example, some monitoring devices may be located with gas lines in the rafters of a building in which a pneumatic system is present for operating equipment.

The different advantageous embodiments recognize and take into account that currently available monitoring devices of pneumatic systems include monitoring devices that use electrical lines or non-rechargeable batteries for power. The use of electrical lines results in an increase in expense to install and maintain the devices. Further, batteries need to be maintained at different intervals.

Further, this maintenance may be made more difficult by the location of the monitoring devices. As another example, maintenance may be required for a monitoring device in a location behind equipment which is not easily accessible for maintenance by a human operator.

Thus, the different advantageous embodiments provide a method and apparatus for monitoring a fluid system, such as a pneumatic system. In one advantageous embodiment, an apparatus comprises a number of sensors, an energy harvesting unit, and a controller. The number of sensors is configured to detect a number of parameters in a fluid system. The energy harvesting unit is configured to generate energy from a fluid in the fluid system into electrical energy. The controller is connected to the number of sensors and the energy harvesting system. The controller is configured to process measurements for the number of parameters detected by the number of sensors. The number of sensors and the controller are powered by the electrical energy generated by the energy harvesting unit.

Additionally, the controller may communicate with a computer system through a wireless communications link. As a result, information from different apparatus making measurements can be received, analyzed, and/or presented in a location that may be more convenient to a human operator.

Figure 3:
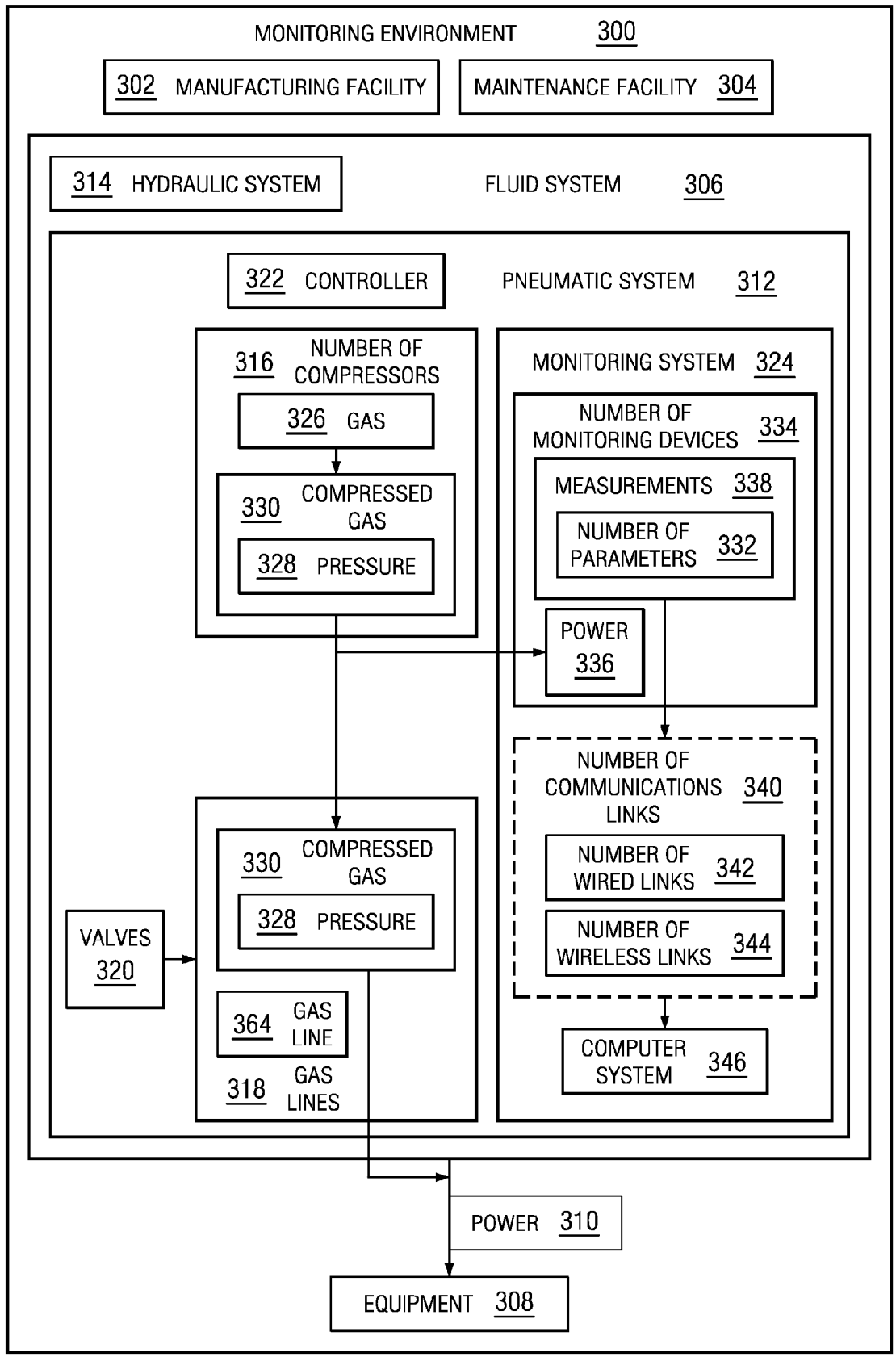
FIG. 3 is an illustration of a monitoring environment in accordance with an advantageous embodiment.

Turning now to FIG. 3, an illustration of a monitoring environment is depicted in accordance with an advantageous embodiment. In this example, monitoring environment 300 is an example of an environment that may be used in aircraft manufacturing and service method 100. Monitoring environment 300 may be used to manufacture and/or maintain aircraft 200 in FIG. 2. For example, monitoring environment 300 may be used during component and subassembly manufacturing 106, system integration 108, maintenance and service 114, and/or in other suitable operations.

In this illustrative example, monitoring environment 300 may include at least one of manufacturing facility 302, maintenance facility 304, and/or some other suitable location. Monitoring environment 300 includes fluid system 306 and equipment 308. Equipment 308 may include, for example, without limitation, a drill, a sander, a fastener installation tool, a rivet, a paint tool, a saw, and/or other suitable equipment.

Fluid system 306 provides power 310 to operate equipment 308. Power 310 takes the form of mechanical or kinetic energy in the depicted examples. Fluid system 306, in these examples, takes the form of pneumatic system 312. Of course, fluid system 306 may take other forms such as, for example, without limitation, hydraulic system 314 and/or any other suitable type of system in which a fluid is used to generate power 310.

In this particular example, pneumatic system 312 comprises number of compressors 316, gas lines 318, valves 320, controller 322, and monitoring system 324. Of course, other components not illustrated may be included within pneumatic system 312. For example, pneumatic system 312 also may include couplers to connect equipment 308 to gas lines 318, switches, booster units, timers, and/or other suitable components.

Number of compressors 316 places gas 326 under pressure 328 to generate compressed gas 330. Pressure 328 of compressed gas 330, in these depicted examples, is from about 80 pounds per square inch to about 100 pounds per square inch. A particular pressure level may be selected or a range of pressure levels may be present for compressed gas 330 in different lines within gas lines 318, such as gas line 364.

In these examples, compressed gas 330 may be selected from at least one of air, an inert gas, nitrogen, helium, or some other suitable type of gas. The particular type of gas selected may depend on equipment, manufacturing requirements, and/or safety requirements.

Gas lines 318 distribute compressed gas 330 from number of compressors 316 to equipment 308. Equipment 308 is operated using compressed gas 330. The flow of compressed gas 330 within gas lines 318 is controlled using valves 320 in these illustrative examples. Valves 320 may be used to selectively direct the flow of compressed gas 330 to different lines within gas lines 318. Further, valves 320 also may be used to change pressure 328 of compresses gas 330 in different lines within gas lines 318.

In this illustrative example, monitoring system 324 monitors number of parameters 332 within pneumatic system 312. Number of parameters 332 may include, for example, without limitation, pressure, air flow, moisture, amount of particulates, and/or other suitable parameters. The parameters selected for number of parameters 332, in these illustrative examples, are parameters that may affect the performance of pneumatic system 312 and/or equipment 308 in monitoring environment 300. Of course, other types of parameters may be selected.

Monitoring system 324 is distributed within pneumatic system 312. In these illustrative examples, monitoring system 324 comprises number of monitoring devices 334 and computer system 346. Number of monitoring devices 334 detects number of parameters 332.

As number of parameters 332 is detected, measurements 338 containing number of parameters 332 is sent by number of monitoring devices 334 to computer system 346. Computer system 346 may be one or more computers in communication with each other. In these examples, number of monitoring devices 334 sends measurements 338 to computer system 346 using number of communications links 340.

Number of communications links 340 may take various forms. For example, without limitation, number of communications links 340 may take the form of number of wired links 342, number of wireless links 344, and/or other suitable types of communications links. In these illustrative examples, number of wireless links 344 may be used to reduce the amount of wiring needed within monitoring environment 300. Further, with the use of number of wireless links 344, the amount of labor needed to install number of monitoring devices 334 also may be reduced.

In these depicted examples, number of monitoring devices 334 generate power from pneumatic system 312 and do not require wires or cables that are connected to a remote power source. More specifically, in these illustrative examples, number of monitoring devices 334 generates power 336 using compressed gas 330 flowing through pneumatic system 312. Number of monitoring devices 334 is associated with or connected to pneumatic system 312 such that compressed gas 330 flows through number of monitoring devices 334 to generate power 336 for number of monitoring devices 334. As one illustrative example, number of monitoring devices 334 may be attached to or placed in line with gas lines 318.

As a result, power lines and batteries are not required to operate number of monitoring devices 334. Also, the amount of labor needed to install this type of system may be reduced. Further, maintenance requirements also may be reduced as compared to a monitoring system in which monitoring devices use batteries. With this type of implementation, maintenance for batteries may be reduced or eliminated.

The illustration of monitoring environment 300 in FIG. 3 is not meant to imply physical or architectural limitations to the manner in which other advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in other advantageous embodiments, number of monitoring devices 334 may be placed in other locations other than being in line with gas lines 318. In some advantageous embodiments, one or more of number of monitoring devices 334 may be attached to valves 320.

As another example, number of monitoring devices 334 may be implemented in other environments in addition to or instead of manufacturing facility 302 and maintenance facility 304. For example, the different advantageous embodiments may be implemented in other types of platforms. For example, without limitation, other advantageous embodiments may be applied to a mobile platform, a stationary platform, a land-based structure, an aquatic-based structure, a space-based structure and/or some other suitable platform. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a building, and/or some other suitable platform.

Figure 4:
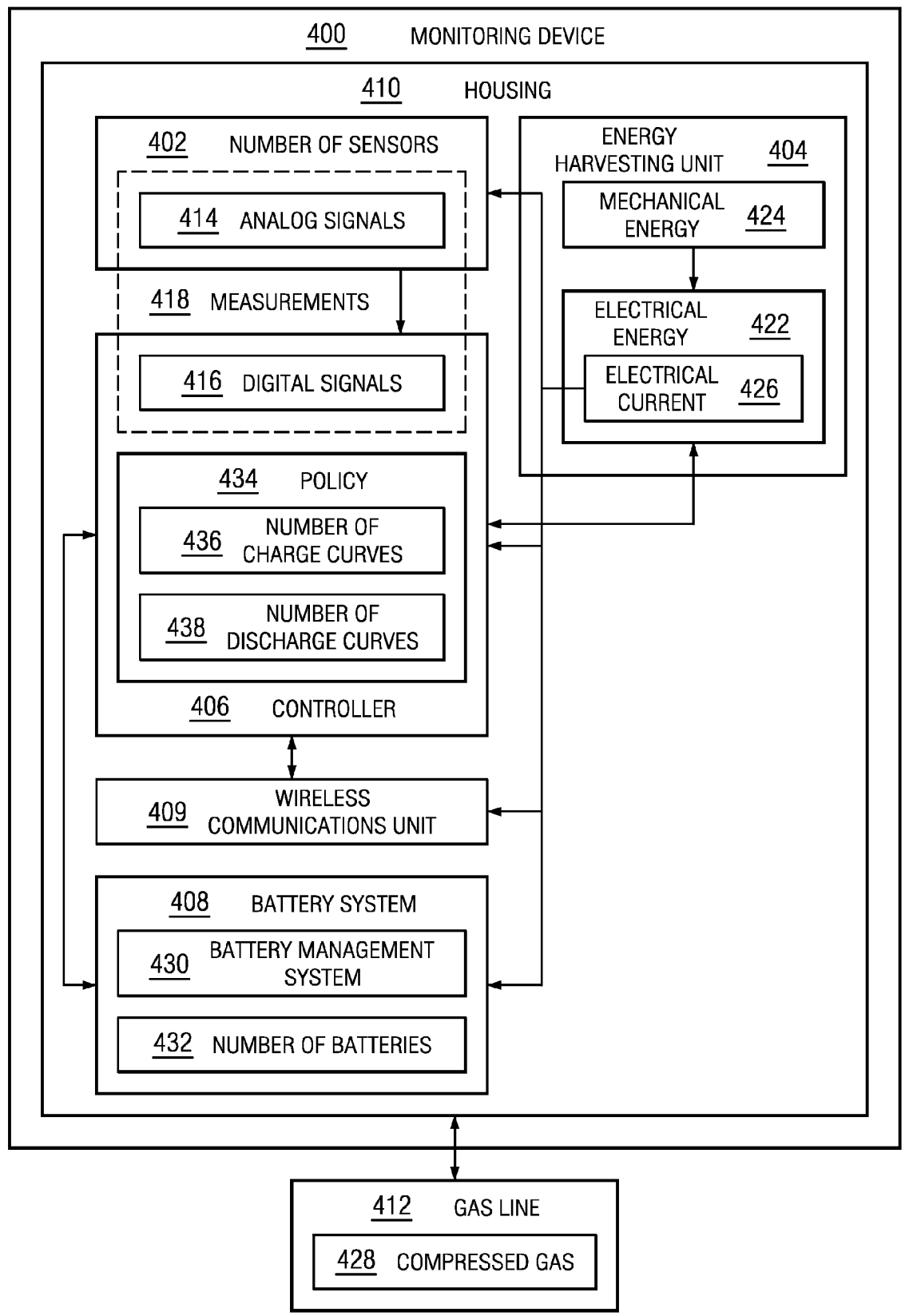
FIG. 4 is an illustration of a monitoring device in accordance with an advantageous embodiment.

With reference now to FIG. 4, an illustration of a monitoring device is depicted in accordance with an advantageous embodiment. In this illustrative example, monitoring device 400 is an example of one implementation for a monitoring device within number of monitoring devices 334 in FIG. 3.

As illustrated, monitoring device 400 comprises number of sensors 402, energy harvesting unit 404, controller 406, battery system 408, and housing 410. Number of sensors 402, energy harvesting unit 404, controller 406, wireless communications unit 409, and battery system 408 are associated with housing 410 in these examples.

In this illustrative example, housing 410 is connected to gas line 412. Gas line 412 is an example of a gas line within gas lines 318 in FIG. 3.

A sensor within number of sensors 402 is a device that measures a physical quantity and converts that measure into a signal. Number of sensors 402 may include, for example, without limitation, a particulate sensor, a flow sensor, a moisture sensor, a temperature sensor, a pressure sensor, a carbon dioxide sensor, a microphone, a hydrogen sensor, a particle detector, and/or other suitable types of sensors.

In this illustrative example, controller 406 controls the operation of monitoring device 400. Controller 406 may be implemented using a number of different types of devices. For example, controller 406 may be a processor, a multi-core processor, a plurality of processors, an application specific integrated circuit, a digital signal processor, and/or some other suitable type of device. Controller 406 is connected to number of sensors 402 in monitoring device 400. Controller 406 detects analog signals 414 generated by number of sensors 402. Controller 406 converts analog signals 414 into digital signals 416. Either or both analog signals 414 and digital signals 416 may form measurements 418.

Energy harvesting unit 404 generates electrical energy 422. Electrical energy 422 produces power to power number of sensors 402, controller 406, and wireless communications unit 409. In some advantageous embodiments, a circuit may be present to control the level of electrical current 426 sent from energy harvesting unit 404 to controller 406. For example, the circuit may control the power provided to controller 406 by controlling the level of voltage and the level of electric current 426 sent to controller 406.

Energy harvesting unit 404 converts mechanical energy 424 into electrical energy 422. Mechanical energy 424 is in the movement and/or expansion of compressed gas 428 in these illustrative examples. Mechanical energy 424 is present in the movement of compressed gas 428 within gas line 412. Additionally, mechanical energy 424 may be present from the expansion of compressed gas 428 in energy harvesting unit 404.

Electrical energy 422 takes the form of electrical current 426. Electrical current 426 is sent to number of sensors 402, controller 406, wireless communications unit 409, and battery system 408.

Battery system 408 includes battery management system 430 and number of batteries 432. Electrical current 426 is used to charge number of batteries 432 through battery management system 430. In some advantageous embodiments, energy harvesting unit 404 sends electrical current 426 to power controller 406 through battery system 408.

The charging and discharging of number of batteries 432 by battery management system 430 is controlled by controller 406 in these examples. The charging and discharging of number of batteries 432 is controlled using policy 434. Policy 434, in these illustrative examples, contains number of charge curves 436 and number of discharge curves 438. These different curves may be used to charge and discharge, respectively, number of batteries 432 in a manner to improve performance and/or longevity of number of batteries 432.

In these illustrative examples, measurements 418 are sent by wireless communications unit 409 over a wireless communications link to a computer system, such as computer system 346 in FIG. 3.

The illustration of monitoring device 400 in FIG. 4 is not meant to imply physical or architectural limitations to a manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, wireless communications unit 409 may be implemented as part of controller 406. As another example, in some advantageous embodiments, battery management system 430 also may be implemented as part of controller 406. In still other advantageous embodiments, monitoring device 400 may include other components, such as a memory and/or a storage device.

As another example, policy 434 may cause controller 406 to start charging battery system 408 if a charge level in battery system 408 falls below a lower limit and stops charging battery system 408 when the charge level in the battery system exceeds an upper limit. The upper limit and the lower limit may have the same value or different values.

Figure 5:
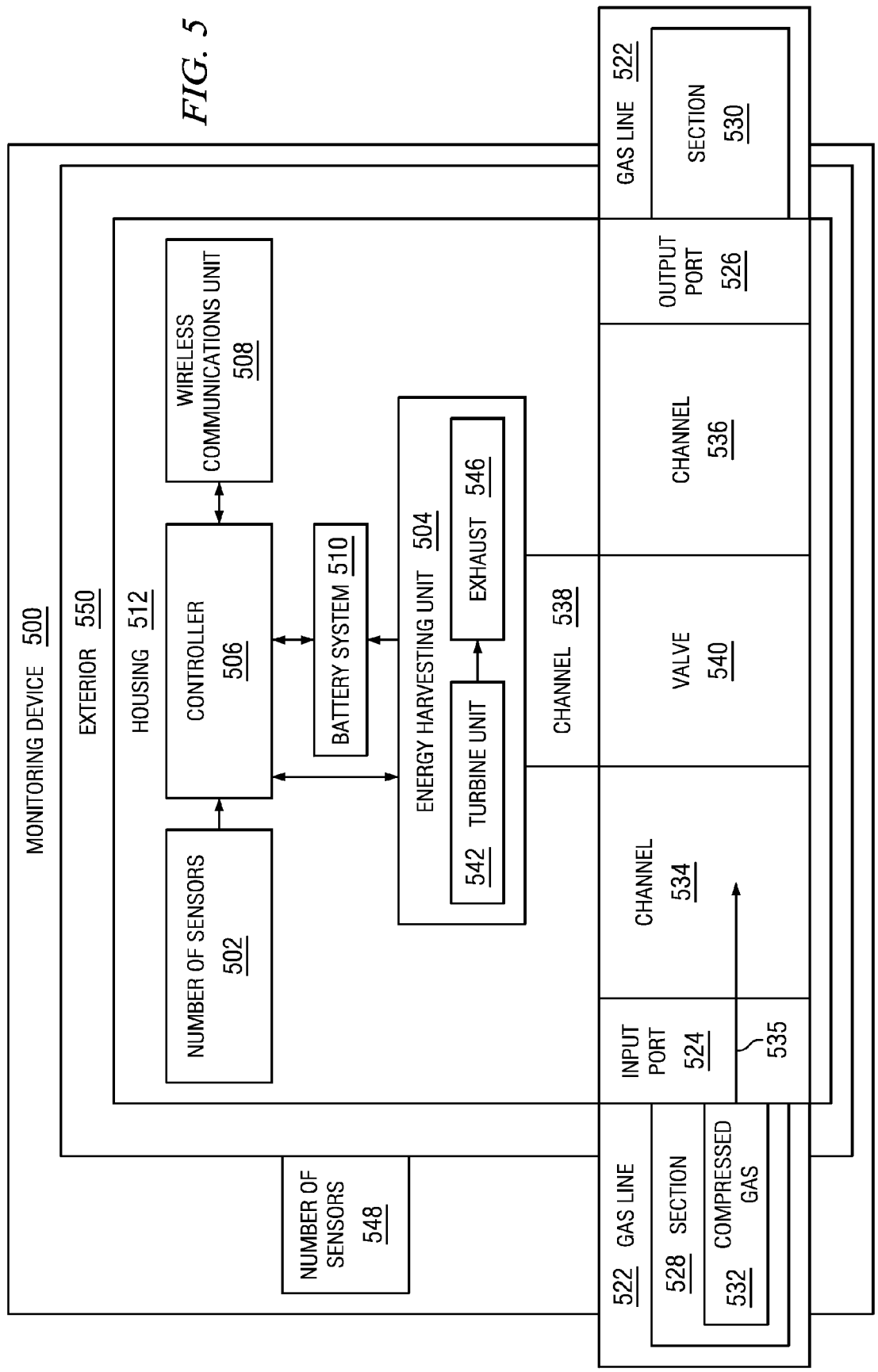
FIG. 5 is an illustration of a monitoring device in accordance with an advantageous embodiment.

Turning now to FIG. 5, an illustration of a monitoring device is depicted in accordance with an advantageous embodiment. Monitoring device 500 is an example of one implementation for number of monitoring devices 334 in FIG. 3 and monitoring device 400 in FIG. 4.

In this illustrative example, monitoring device 500 comprises number of sensors 502, energy harvesting unit 504, controller 506, wireless communications unit 508, battery system 510, and housing 512. Number of sensors 502, energy harvesting unit 504, controller 506, wireless communications unit 508, and battery system 510 are located within housing 512 in these illustrative examples.

As depicted, monitoring device 500 is connected to gas line 522. Gas line 522 is an example of a gas line in gas lines 318 in FIG. 3. Housing 512 has input port 524 and output port 526.

Section 528 of gas line 522 is connected to input port 524. Section 530 of gas line 522 is connected to output port 526. In this illustrative example, compressed gas 532 moves in the direction of arrow 535 within gas line 522 into input port 524 of housing 512. Channel 534, channel 536, and channel 538 are present within housing 512. These channels are configured to facilitate the flow of compressed gas 532 within housing 512.

Channel 534 is connected to input port 524 and valve 540. Channel 536 is connected to valve 540 and output port 526. Channel 538 is connected to valve 540 and energy harvesting unit 504. Valve 540 controls the flow of compressed gas 532 within channels 534, 536, and 538. For example, valve 540 in a first position may prevent gas from flowing through channel 534. In another position, valve 540 may cause compressed gas 532 to flow through channel 534 into channel 536. In another position, valve 540 may cause compressed gas 532 to flow from channel 534 into channel 538. Additionally, valve 540 may have other positions that allow different amounts of compressed gas to flow from channel 534 into both channel 536 and channel 538.

When compressed gas 532 flows through channel 538 into energy harvesting unit 504, energy harvesting unit 504 generates power to power number of sensors 502, controller 506, and wireless communications unit 508. Further, energy harvesting unit 504 also may generate electrical energy to charge battery system 510.

In these examples, the electrical energy is generated in the form of an electrical current. This electrical current, in these examples, flows through battery system 510 into controller 506. Controller 506 is connected to number of sensors 502. Electrical current may flow from controller 506 to number of sensors 502 to provide power to number of sensors 502. In a similar fashion, controller 506 is connected to wireless communications unit 508. Electrical current generated by energy harvesting unit 504 flows through controller 506 to wireless communications unit 508.

In this illustrative example, energy harvesting unit 504 takes the form of turbine unit 542. Turbine unit 542 contains a number of blades, a propeller, and/or some other device that turns as compressed gas 532 passes through energy harvesting unit 504.

Channel 536 leads to exhaust 546 in these illustrative examples. Exhaust 546 is an output port that allows compressed gas 532 to be vented or to escape into the air.

In these illustrative examples, number of sensors 502 is positioned to detect parameters to generate analog signals for measurements of compressed gas 532 as compressed gas 532 passes through channel 536. Additionally, in some advantageous embodiments, monitoring device 500 also may include number of sensors 548. Number of sensors 548 may be located on exterior 550 of housing 512 or in a remote location to detect other parameters other than parameters with respect to conditions within gas line 522.

For example, number of sensors 548 may detect other parameters such as, for example, temperature, humidity, carbon dioxide levels, and/or other suitable parameters in the environment around or outside of housing 512 of monitoring device 500. In yet other advantageous embodiments, number of sensors 548 may include a video camera to obtain data regarding the operation of equipment or other objects.

Figure 6:
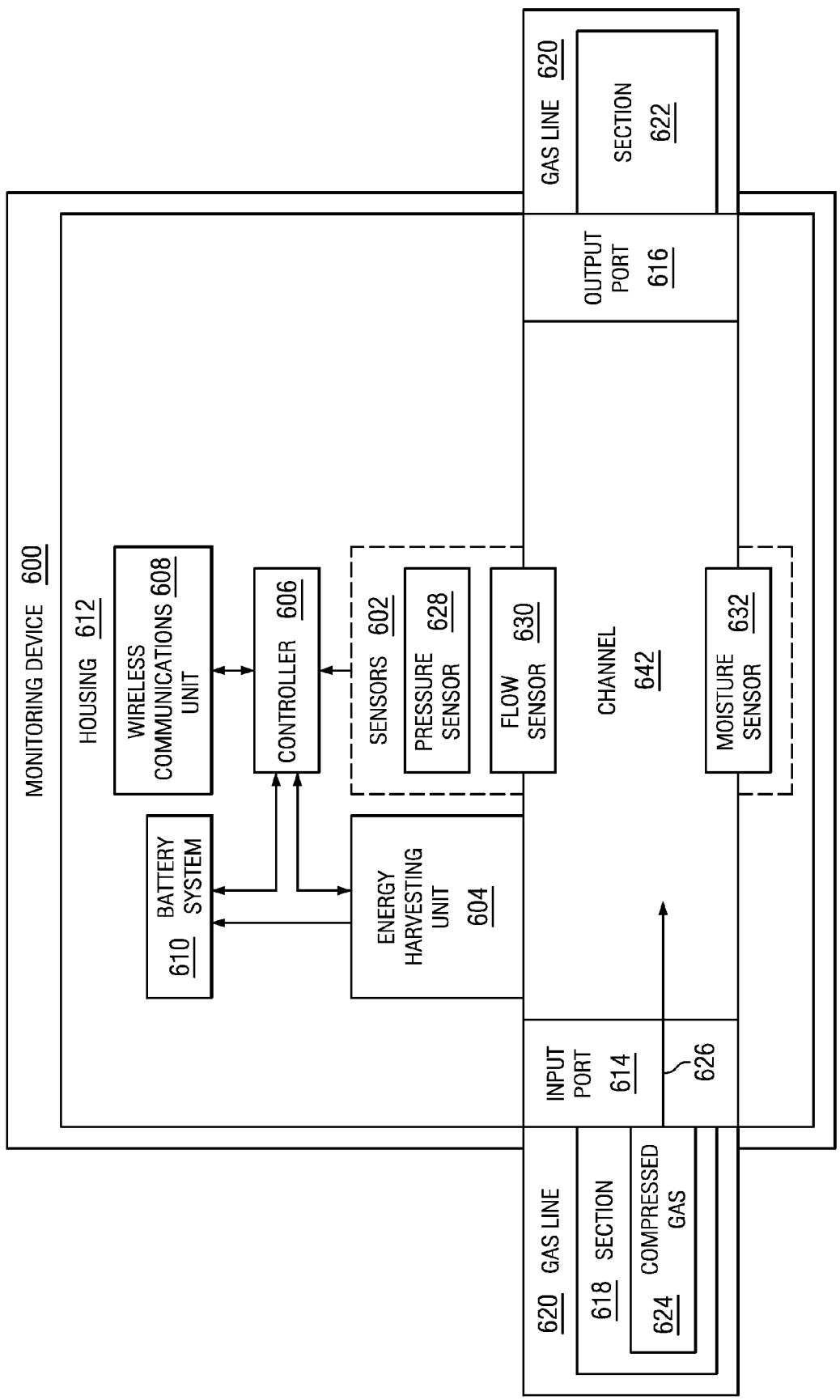
FIG. 6 is an illustration of a monitoring device in accordance with an advantageous embodiment.

With reference now to FIG. 6, an illustration of a monitoring device is depicted in accordance with an advantageous embodiment. Monitoring device 600 is an example of one implementation for number of monitoring devices 334 in FIG. 3 and monitoring device 400 in FIG. 4. As can be seen in this example, monitoring device 600 includes sensors 602, energy harvesting unit 604, controller 606, wireless communications unit 608, battery system 610, and housing 612.

Housing 612 has input port 614 and output port 616. Input port 614 is connected to section 618 of gas line 620. Output port 616 is connected to section 622 of gas line 620. Compressed gas 624 flows through section 618 into input port 614 in the direction of arrow 626. In these illustrative examples, sensors 602 include pressure sensor 628, flow sensor 630, and moisture sensor 632. Sensors 602 detect parameters for compressed gas 624 flowing through channel 642 within housing 612.

Sensors 602 are connected to controller 606, which transmits measurements made using sensors 602 over a wireless communications link using wireless communications unit 608.

Energy harvesting unit 604 is connected to channel 642 and generates electrical energy from the flow of compressed gas 624 in the direction of arrow 626 in channel 642. This electrical energy takes the form of an electrical current that is sent to controller 606 to power controller 606. The electrical current is also sent through battery system 610, which also may store the electrical energy and/or send the electrical energy to controller 606. The current sent to controller 606 is sent to sensors 602 through controller 606 to power sensors 602 in these examples.

The illustration of monitoring device 500 in FIG. 5 and monitoring device 600 in FIG. 6 are only meant as examples of some implementations for number of monitoring devices 334 in FIG. 3 and monitoring device 400 in FIG. 4. Other configurations and components may be present in other advantageous embodiments other than those shown in monitoring device 500 in FIG. 5 and monitoring device 600 in FIG. 6. For example, in some advantageous embodiments, input port 524 may be connected to a valve rather than a section of a gas line.

Figure 7:
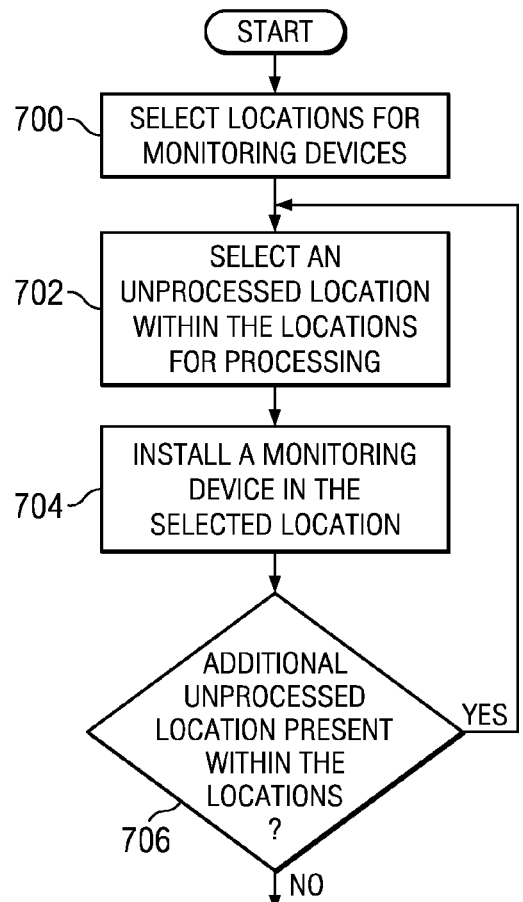
FIG. 7 is a flowchart of a process for installing monitoring devices in accordance with an advantageous embodiment.

With reference now to FIG. 7, a flowchart of a process for installing monitoring devices is depicted in accordance with an advantageous embodiment. The process illustrated in FIG. 7 may be implemented to install monitoring devices in an environment, such as monitoring environment 300 in FIG. 3.

The process begins by selecting locations for monitoring devices (operation 700). Thereafter, an unprocessed location within the locations is selected for processing (operation 702). A monitoring device is installed in the selected location (operation 704). This selected location may be, for example, a gas line, a valve, or some other suitable location. With a gas line, the monitoring device may be inserted in line with the gas line.

Thereafter, a determination is made as to whether an additional unprocessed location is present within the locations (operation 706). If an additional unprocessed location is present, the process returns to operation 702. Otherwise, the process terminates.

Figure 8:
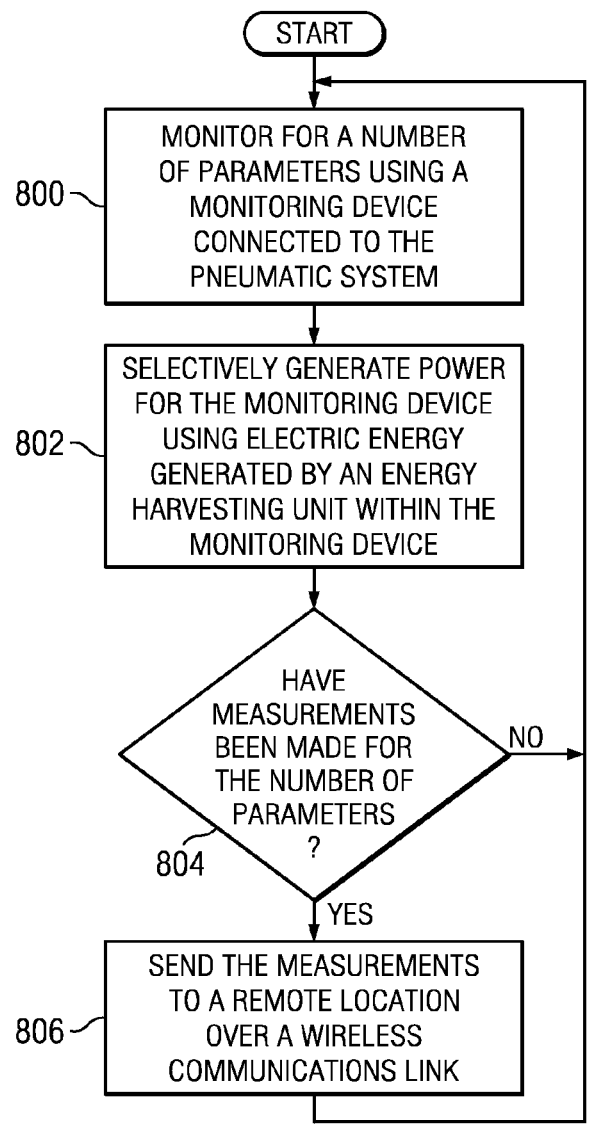
FIG. 8 is a flowchart of a process for monitoring a pneumatic system in accordance with an advantageous embodiment.

With reference next to FIG. 8, a flowchart of a process for monitoring a pneumatic system is depicted in accordance with an advantageous embodiment. The process illustrated in FIG. 8 may be implemented in an environment, such as monitoring environment 300 in FIG. 3 to monitor pneumatic system 312 in FIG. 3.

The process begins by monitoring for a number of parameters using a monitoring device connected to the pneumatic system (operation 800). The process selectively generates power for the monitoring device using electric energy generated by an energy harvesting unit within the monitoring device (operation 802). In this illustrative example, power for the monitoring device may be selectively generated based on a condition, such as the level of charge for a battery system within the monitoring device.

A determination is made as to whether measurements have been made for the number of parameters (operation 804). In these illustrative examples, the measurements may be made by receiving analog signals detected by a number of sensors for the number of parameters. In other advantageous embodiments, the measurements may be made when the analog signals have been converted into digital signals. In still other advantageous embodiments, measurements may be considered to be made after some processing of the digital, flash, and/or analog signals has been made. For example, other operations, such as filtering, sampling, and/or other suitable operations may be performed to generate the measurements for operation 804.

If measurements have been made, the process sends the measurements to a remote location over a wireless communications link (operation 806). The process then returns to operation 800 as described above. If measurements have not been made, the process also returns to operation 800 as described above.

Figure 9:
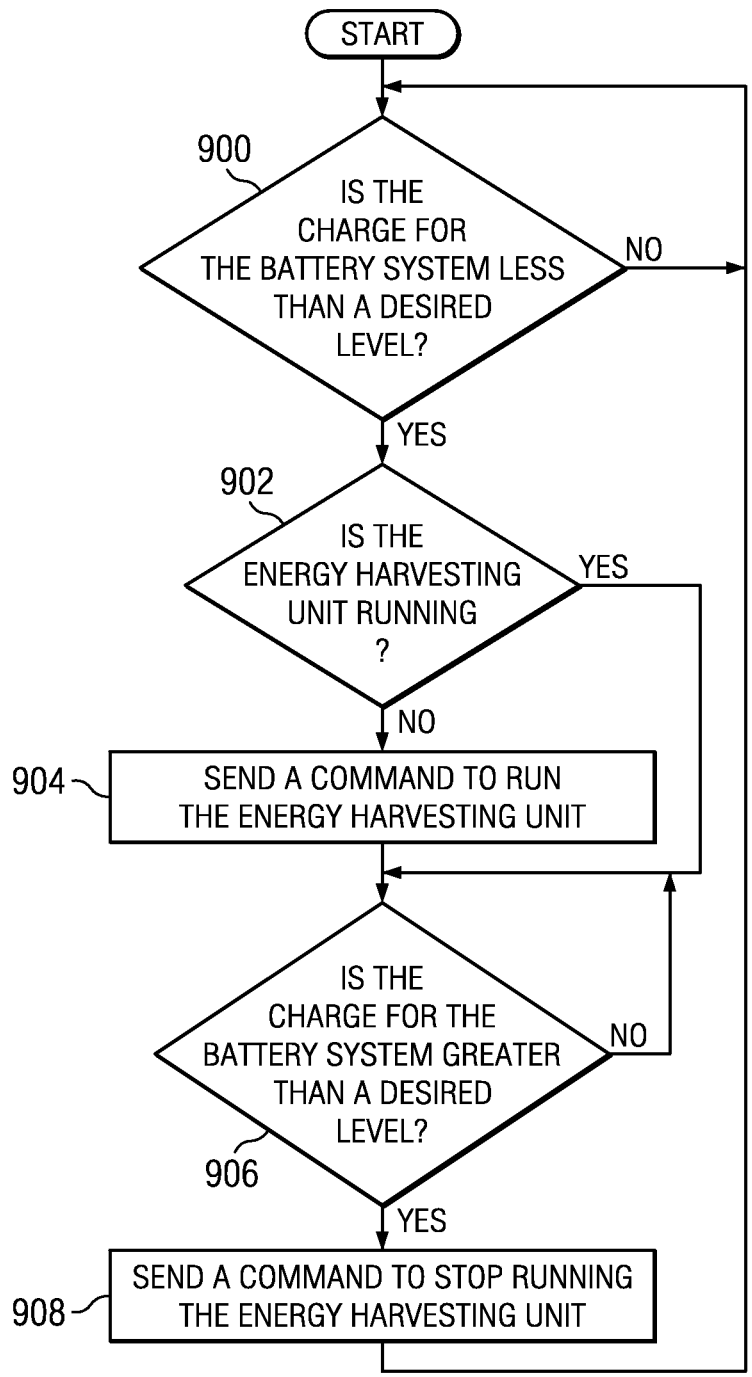
FIG. 9 is an illustration of a flowchart of a process for controlling an energy harvesting unit in accordance with an advantageous embodiment.

With reference now to FIG. 9, an illustration of a flowchart of a process for controlling an energy harvesting unit is depicted in accordance with an advantageous embodiment. The process illustrated in FIG. 9 is a more detailed process for operation 802 in FIG. 8. The process may be implemented with monitoring device 400 in FIG. 4. In particular, the process may be implemented by using controller 406 to control energy harvesting unit 404 in FIG. 4.

The process begins by determining whether the charge for the battery system is less than a desired level (operation 900). The desired level may be selected to increase the life of the battery system. This desired level may be a battery system charge of, for example, without limitation, 0 percent, 10 percent, 20 percent, or some other suitable level of charge. In this illustrative example, the battery system may be implemented using battery system 408 in FIG. 4. Further, controller 406 may make the determination based on input received from battery management system 430.

If the charge for the battery system is not less than a desired level, the process returns to operation 900. Otherwise, the process determines whether the energy harvesting unit is running (operation 902). In this illustrative example, the energy harvesting unit may not be running if the energy harvesting unit is not receiving power or is idle. If the energy harvesting unit is running, the operation returns to operation 902. Otherwise, if the energy harvesting unit is not running, the process then sends a command to run the energy harvesting unit (operation 904).

Thereafter, the process determines whether the charge for the battery system is greater than a desired level (operation 906). The desired level in operation 904 may be selected to increase the life of the battery system. For example, this desired level may be, without limitation, 80 percent, 90 percent, 100 percent, or some other suitable level of charge.

If the charge for the battery system is not greater than a desired level, the process returns to operation 906. Otherwise, if the charge for the battery system is greater than the desired level, the process sends a command to stop running the energy harvesting unit (operation 908). The energy harvesting unit may stop running when the power for the energy harvesting unit is turned off or when the energy harvesting unit is idle. Thereafter, the process returns to operation 900.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, the generation of power and the charging of the battery system may be performed at the same time that monitoring for measurements is performed.

Thus, the different advantageous embodiments provide a method and apparatus for monitoring a pneumatic system. In one advantageous embodiment, an apparatus comprises a number of sensors, an energy harvesting unit, and a controller. The number of sensors is configured to detect a number of parameters. The energy harvesting unit is configured to generate electrical energy from a compressed gas in the pneumatic system. The controller is connected to the number of sensors and the energy harvesting unit. The controller is configured to process measurements for the number of parameters detected by the number of sensors. The number of sensors and the controller are powered by the energy harvesting unit.

The different advantageous embodiments also provide an ability to monitor different portions of a system, such as a pneumatic system. The monitoring is performed in a manner that reduces the number of wires needed to obtain measurements of desired parameters and send those measurements for processing. Further, the different advantageous embodiments reduce the number of wires needed to power a system by employing energy harvesting units within the different monitoring systems.

For example, in some advantageous embodiments, a monitoring device may not need an energy harvesting unit. Instead, the monitoring device may be connected to another monitoring device containing an energy harvesting unit that is configured to provide energy for both monitoring devices.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a number of sensors configured to detect a number of parameters;
an energy harvesting unit configured to generate electrical energy by converting mechanical energy into the electrical energy, the mechanical energy obtained from at least one of the expansion and the movement of a compressed gas in a pneumatic system, and wherein the electrical energy is in the form of electrical current;
an energy storage device configured to receive and store the electrical energy, the energy storage device further configured to distribute the electrical energy to a controller;
the controller connected to the number of sensors and the energy harvesting unit, wherein the controller is configured to process measurements for the number of parameters detected by the number of sensors, and wherein the number of sensors and the controller are powered by the energy harvesting unit; and
a housing, wherein the number of sensors, the energy harvesting unit, the energy storage device, and the controller are located within the housing, the housing having an input and an output, wherein the input is configured to receive the compressed gas in a first section of a gas line and the output is configured to send the compressed gas into a second section in the gas line; the housing further comprising:
a first channel in communication with the input;
a second channel in communication with the output;
a third channel in communication with the energy harvesting unit; and
a valve connected to the first channel, the second channel, and the third channel, wherein the valve is configured to direct a flow of the compressed gas in the first channel to at least one of the second channel and the third channel, the valve further configured to change a pressure of the compressed gas in the gas line.

2. The apparatus of claim 1, wherein the energy storage device is a battery system.

3. The apparatus of claim 1, wherein the energy harvesting unit comprises:
a turbine unit configured to generate an electrical current from the flow of the compressed gas through the turbine unit.

4. The apparatus of claim 1, wherein the controller is configured to communicate with a computer system using at least one of a wireless communications link and a wired communications link.

5. The apparatus of claim 2, wherein the controller is configured to control charging of the battery system using a policy.

6. The apparatus of claim 5, wherein the policy is configured to cause the controller to start charging the battery system if a charge level in the battery system falls below a lower limit and stops charging the battery system when the charge level in the battery system exceeds an upper limit.

7. The apparatus of claim 6, wherein the controller is directly connected to the energy harvesting unit.

8. The apparatus of claim 5, wherein the policy is configured to cause the controller to charge and discharge the battery system using a number of charge and discharge curves for the battery system in the policy.

9. The apparatus of claim 1, wherein the controller is configured to process the measurements by sending the measurements to a computer system.

10. The apparatus of claim 1, wherein the controller is configured to process the measurements by analyzing the measurements.

11. The apparatus of claim 1, wherein the number of parameters is for at least one of the pneumatic system and an environment in which the pneumatic system is located.

12. The apparatus of claim 1, wherein the controller comprises at least one of an application specific integrated circuit, a central processing unit, and a processor unit.

13. The apparatus of claim 1, wherein the number of sensors comprises at least one of a moisture sensor, a flow sensor, a pressure sensor, a particulate sensor, a temperature sensor, a carbon dioxide sensor, a microphone, a hydrogen sensor, a particle detector, and a video camera.

14. The apparatus of claim 1 further comprising:
the pneumatic system.

15. The apparatus of claim 1, further comprising the controller making measurements based upon performing at least one of processing digital signals, processing flash signals, processing analog signals, processing image data, filtering, sampling, and collecting additional measurement data.

16. An apparatus comprising:
a number of sensors configured to detect a number of parameters in a fluid system;
an energy harvesting unit configured to generate electrical energy from at least one of the expansion and the movement of a fluid in the fluid system;
an energy storage device configured to receive and store the electrical energy, the energy storage device further configured to distribute the electrical energy to a controller;
a controller in communication with the number of sensors and the energy harvesting unit, wherein the controller is configured to process measurements for the number of parameters detected by the number of sensors and control operation of the energy harvesting unit and wherein the number of sensors and the controller are powered by the electrical energy generated by the energy harvesting unit; and
a housing, wherein the number of sensors, the energy harvesting unit, the energy storage device, and the controller are located within the housing, the housing having an input and an output, wherein the input is configured to receive the fluid in a first section of a line and the output is configured to send the fluid into a second section in the line; the housing further comprising:
a first channel in communication with the input;
a second channel in communication with the output;
a third channel in communication with the energy harvesting unit; and
a valve connected to the first channel, the second channel, and the third channel, wherein the valve is configured to direct a flow of the fluid in the first channel to at least one of the second channel and the third channel, the valve further configured to change a pressure of the fluid in the line.

17. The apparatus of claim 16, wherein the fluid system is selected from one of a hydraulic system and a pneumatic system.

18. A method for monitoring a pneumatic system, the method comprising:
monitoring for a number of parameters using a monitoring device connected to the pneumatic system, wherein the monitoring device comprises a number of sensors configured to detect the number of parameters; an energy harvesting unit configured to generate electrical energy by converting mechanical energy into the electrical energy, the mechanical energy obtained from at least one of the expansion and the movement of a compressed gas in a pneumatic system, and wherein the electrical energy is in the form of electrical current; an energy storage device configured to receive and store the electrical energy, the energy storage device further configured to distribute the electrical energy to a controller; the controller in communication with the number of sensors and the energy harvesting unit, wherein the controller is configured to process measurements for the number of parameters detected by the number of sensors and control operation of the energy harvesting unit; and a housing, wherein the number of sensors, the energy harvesting unit, the energy storage device, and the controller are located within the housing, the housing having an input and an output, wherein the input is configured to receive the compressed gas in a first section of a gas line and the output is configured to send the compressed gas into a second section in the gas line; the housing further comprising a first channel in communication with the input; a second channel in communication with the output; a third channel in communication with the energy harvesting unit; and a valve connected to the first channel, the second channel, and the third channel, wherein the valve is configured to direct a flow of the compressed gas in the first channel to at least one of the second channel and the third channel, the valve further configured to change a pressure of the compressed gas in the gas line; and
powering the monitoring device using the electrical energy generated by the energy harvesting unit.

19. The method of claim 18 further comprising:
sending the measurements to a remote location.

20. The method of claim 18, wherein the measurements are received from the number of sensors as analog signals and the controller converts the analog signals into digital signals.

21. The method of claim 19, wherein the measurements are sent to the remote location over a wireless communications link.

22. The method of claim 18 further comprising:
installing the monitoring device in the pneumatic system.

23. The method of claim 18, wherein the energy storage device is a battery system, the method further comprising:
charging the battery system in the monitoring device using the energy harvesting unit, and
distributing the energy stored in the battery system back into the pneumatic system via distributing the energy to the controller, wherein the distributing of the stored energy previously received and stored using the energy harvesting unit creates a cyclical system wherein energy is reused and energy waste is minimized.

24. The method of claim 18, wherein the number of sensors and the controller are powered by the energy harvesting unit.

* * * * *